(12) United States Patent
Gnutti et al.

(10) Patent No.: US 10,731,769 B2
(45) Date of Patent: Aug. 4, 2020

(54) FLUID DISPENSING AND RECIRCULATION VALVE

(71) Applicants: CAMOZZI AUTOMATION S.P.A., Brescia (IT); COROB S.p.A, Modena (IT)

(72) Inventors: Gianluca Gnutti, Brescia (IT); Giovanni Camozzi, Brescia (IT); Lars Jonas Fagerstrom, Stockholm (SE)

(73) Assignees: CAMOZZI AUTOMATION S.P.A., Brescia (IT); COROB S.p.A., Modena (IT)

( * ) Notice: Subject to any disclaimer, the term of this patent is extended or adjusted under 35 U.S.C. 154(b) by 192 days.

(21) Appl. No.: 14/401,836

(22) PCT Filed: Apr. 22, 2013

(86) PCT No.: PCT/IB2013/053167
§ 371 (c)(1),
(2) Date: Jun. 19, 2015

(87) PCT Pub. No.: WO2013/171598
PCT Pub. Date: Nov. 21, 2013

(65) Prior Publication Data
US 2015/0300517 A1 Oct. 22, 2015

(30) Foreign Application Priority Data
May 18, 2012 (IT) .......................... BS2012A000086

(51) Int. Cl.
*F16K 27/02* (2006.01)
*B01F 5/10* (2006.01)
(Continued)

(52) U.S. Cl.
CPC ................ *F16K 27/02* (2013.01); *B01F 5/10* (2013.01); *B05B 12/149* (2013.01); *B05B 15/58* (2018.02);
(Continued)

(58) Field of Classification Search
CPC ..... B05B 1/3093; B05B 12/149; F16K 27/02; B01F 5/10
(Continued)

(56) References Cited

U.S. PATENT DOCUMENTS 3,550,625 A * 12/1970 Adams, Jr. ............... F16K 27/02
                                                    137/614.2
4,424,738 A *  1/1984 Leighton ............... F16K 17/044
                                                    137/116.5
(Continued)

FOREIGN PATENT DOCUMENTS

DE    19649888 A1    6/1998
EP     0417537 A1    3/1991
(Continued)

OTHER PUBLICATIONS

International Search Report in PCT/IB2013/053167 dated Jul. 15, 2013.
(Continued)

*Primary Examiner* — Angelisa L. Hicks
(74) *Attorney, Agent, or Firm* — Henry J. Cittone; Cittone Demers & Arneri, LLP

(57) ABSTRACT

A fluid recirculation and dispenser valve unit of a fluid comprises a fluid recirculation and dispenser valve and a cartridge in which an axial valve seat is made which at least partially houses said valve. Said valve comprises a valve body and a valve rod which extends partially in said valve body and which is axially movable between a closed rearward position of the valve and an open forward position of
(Continued)

the valve. The axial valve seat comprises a proximal recirculation portion, which communicates fluidically with a recirculation duct, and a distal dispenser portion in fluidic communication with a dispenser duct.

23 Claims, 13 Drawing Sheets

(51) Int. Cl.
    *B05B 12/14*       (2006.01)
    *B05B 15/58*       (2018.01)
    *B01F 13/10*       (2006.01)
    *B01F 3/00*        (2006.01)

(52) U.S. Cl.
    CPC ... *B01F 13/1058* (2013.01); *B01F 2003/0028* (2013.01)

(58) Field of Classification Search
    USPC .............. 137/487.5, 536; 222/504; 239/412; 251/321
    See application file for complete search history.

(56) References Cited

U.S. PATENT DOCUMENTS

| | | | | |
|---|---|---|---|---|
| 6,089,413 A | * | 7/2000 | Riney | ................... B05B 7/0861 222/318 |
| 6,669,057 B2 | * | 12/2003 | Saidman | ................. B05C 5/001 222/146.5 |
| 8,322,364 B2 | * | 12/2012 | Lacasse | .............. F16K 27/0281 137/270 |
| 2005/0258390 A1 | * | 11/2005 | Stier | ....................... F16K 41/12 251/335.2 |
| 2009/0092386 A1 | | 4/2009 | Kishimoto et al. | |
| 2011/0132923 A1 | | 6/2011 | Miller | |
| 2012/0061426 A1 | * | 3/2012 | Hogan | .................. B05C 5/0225 222/504 |

FOREIGN PATENT DOCUMENTS

| | | |
|---|---|---|
| EP | 0565972 A1 | 10/1993 |
| EP | 0715883 B2 | 4/2004 |
| FR | 267007 A1 | 12/1992 |
| WO | 2011149702 A2 | 12/2011 |
| WO | 2013171598 A1 | 11/2013 |
| WO | 2013171773 A1 | 11/2013 |

OTHER PUBLICATIONS

International Search Report in PCT/IT2012/000145 dated Feb. 18, 2013.

Written Opinion of the International Searching Authority in PCT/IT2012/000145 dated Nov. 18, 2014.

\* cited by examiner

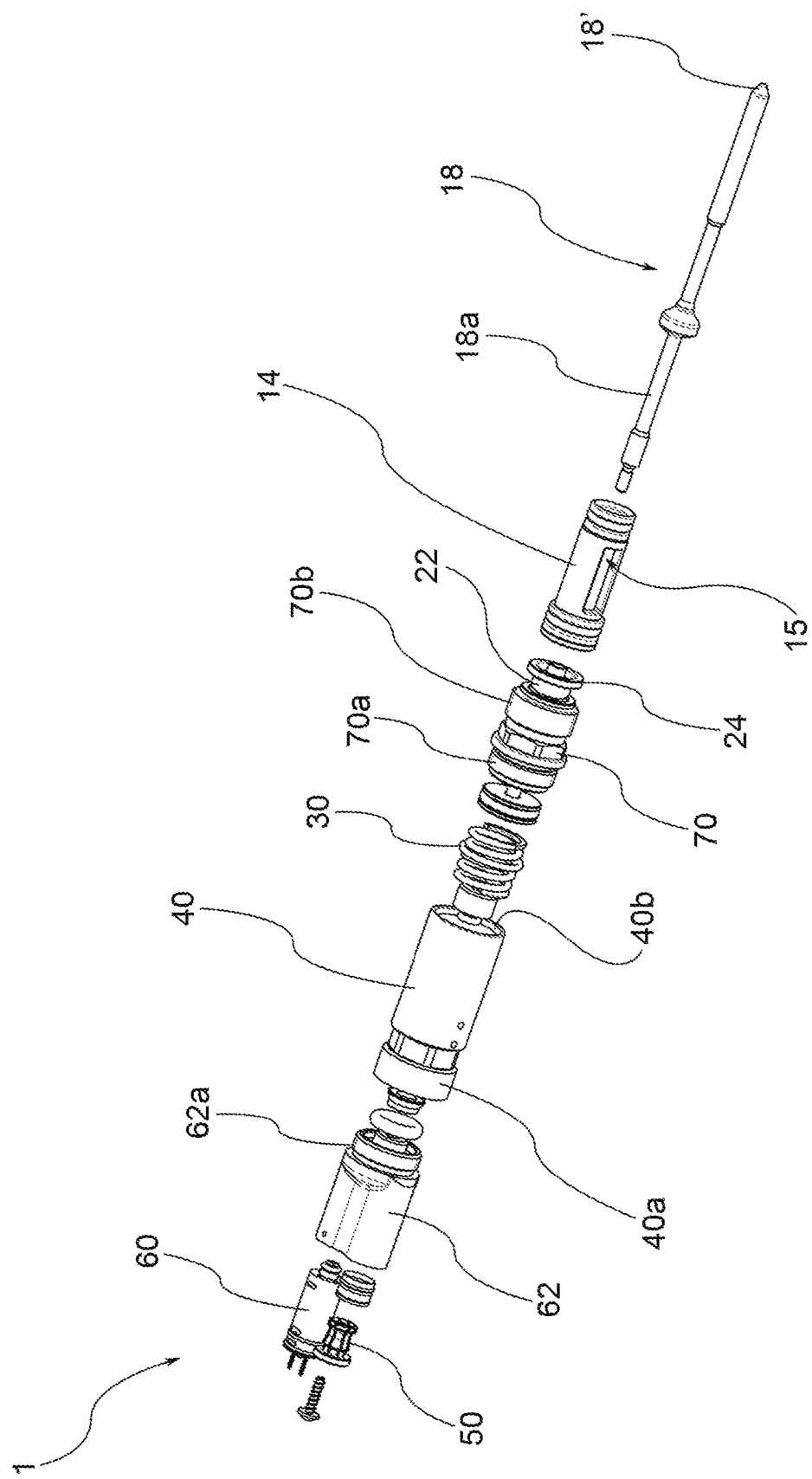

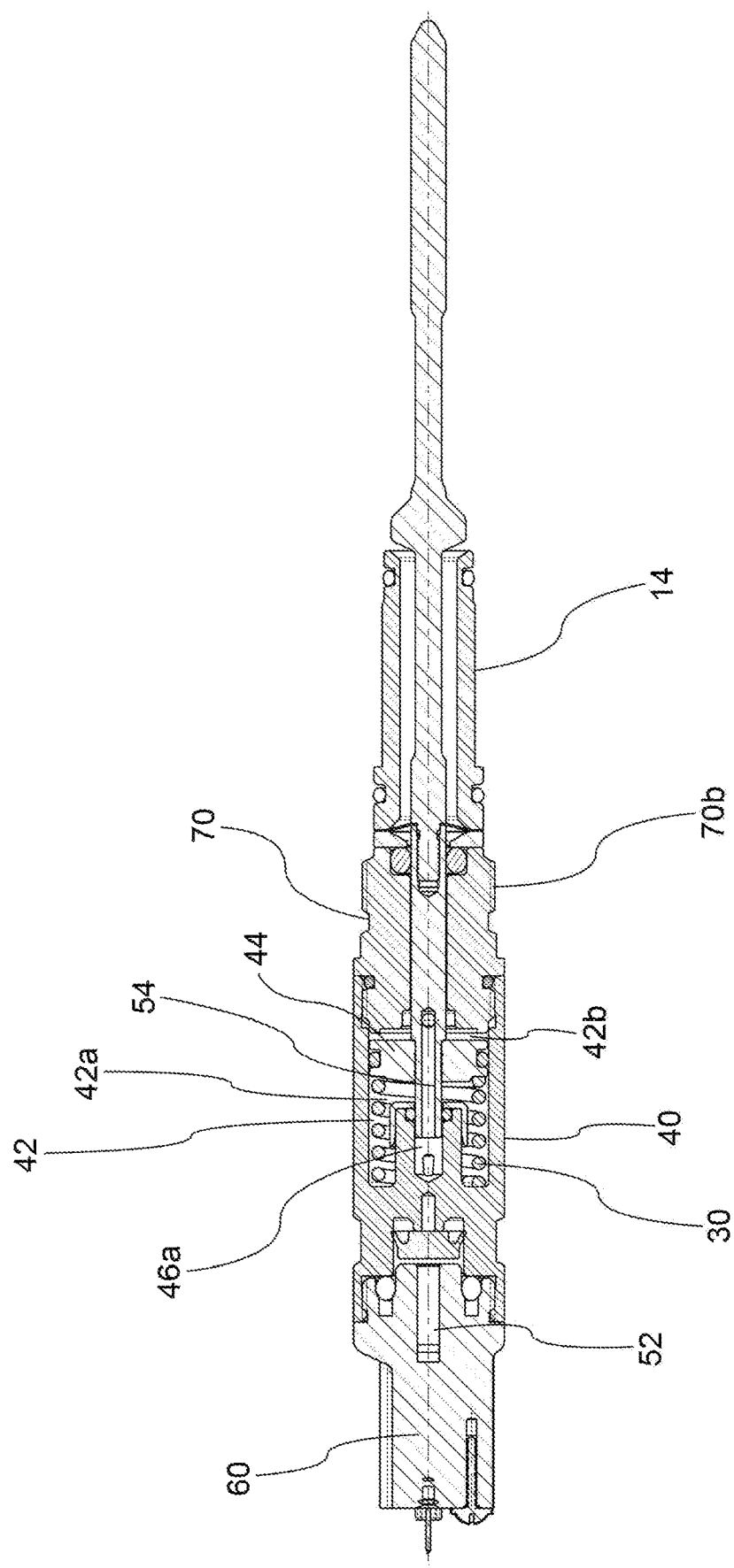

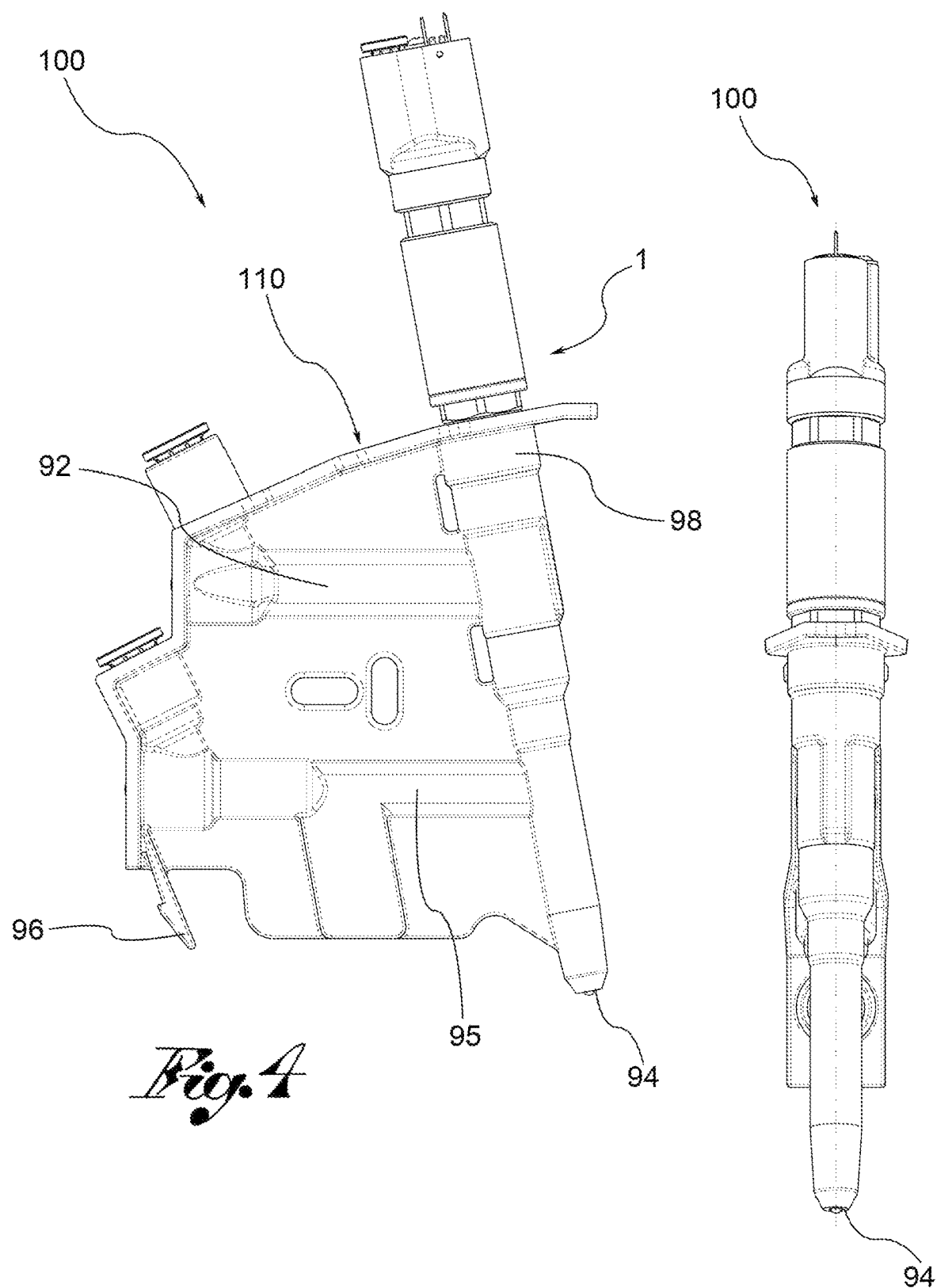

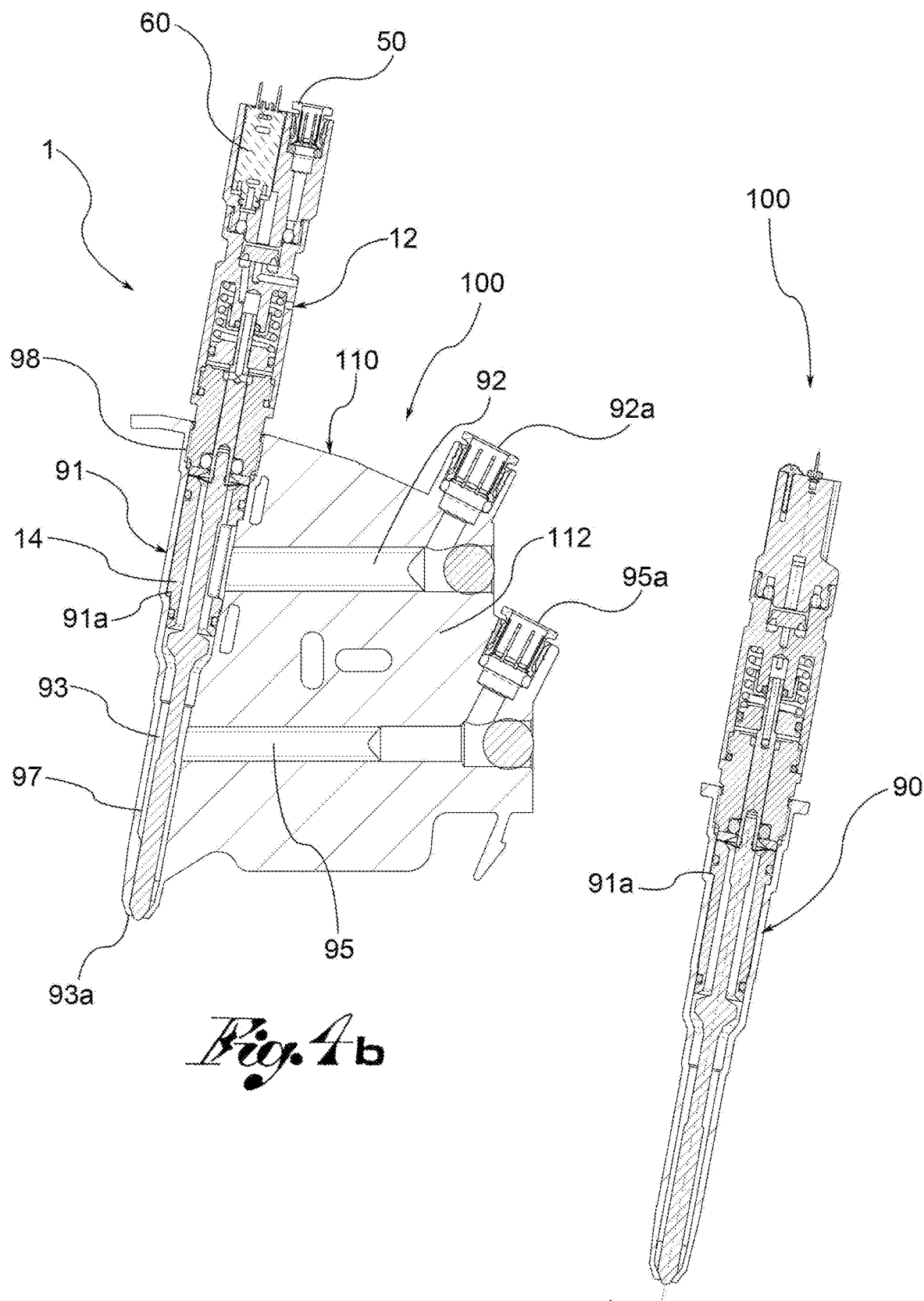

FLUID DISPENSING AND RECIRCULATION VALVE

CROSS-REFERENCE TO RELATED APPLICATIONS

This application is the U.S. national stage of PCT International Patent Application No. PCT/IB2013/053167, filed Apr. 22, 2013, which claims priority to Italian Patent Application No. BS2012A000086, filed May 18, 2012, the disclosures of each of which are incorporated herein by reference in their entirety.

The present invention relates to a fluid recirculation and dispenser valve unit in particular of an industrial dye or varnish, paint or similar product, without excluding other types of fluid product, such as medications, and a dispenser head supporting a plurality of valve units.

To resolve the problem of preserving a fluid to be dispensed, especially a varnish or dye, in the best conditions possible and for as long as possible, while at the same time avoiding the use of solvents harmful to people and the environment, dispenser devices have already been proposed comprising a support bearing a plurality of valves, each of which communicating with a fluid supply duct and with a fluid recirculation duct, and fitted with a dispenser nozzle.

Each valve is fitted with an obturator element movable between a first rest position, in which the nozzle is kept closed and all the fluid supplied in input is sent for recirculation, for example by means of a supply pump, and a second dispensing position, in which the nozzle is opened and at least part of the fluid supplied in input is dispensed.

Examples of such devices are described in US2011132923A1 and EP0645564A1. The prior devices are not however without drawbacks. In particular, the fluid supplied in input and directed towards the recirculation duct ends up contaminating the actuation components of the valve, reducing its duration and contaminating the same.

In addition, fluid dispenser stations comprising a large number of valves of the type described above take a long time to install and are problematic in terms of maintenance and replacement of the individual valves, in part on account of the bundles of electric, pneumatic cables and of the fluid to be dispensed and recirculated which need to be brought and connected to the valves.

The purpose of the present invention is to propose a fluid recirculation and dispenser valve unit, in particular of a dye agent or its components, and a dispenser head, which makes it possible to overcome such drawbacks.

The characteristics and advantages of the invention will be more clearly comprehensible from the description given below of its preferred embodiments, made by way of a non-limiting example, with reference to the appended drawings, wherein:

FIG. 2 is an exploded perspective view of a recirculation and dispenser valve according to the invention, in a practical embodiment;

FIG. 3 is an axial cross-section of the assembled valve, along the line B-B in FIG. 2a;

FIGS. 4 and 4a show, in a side view and an end view respectively, an inner recirculation and dispenser valve unit according to the invention;

FIGS. 4b and 4c are two axial cross-sections of the valve unit;

Figure 1:
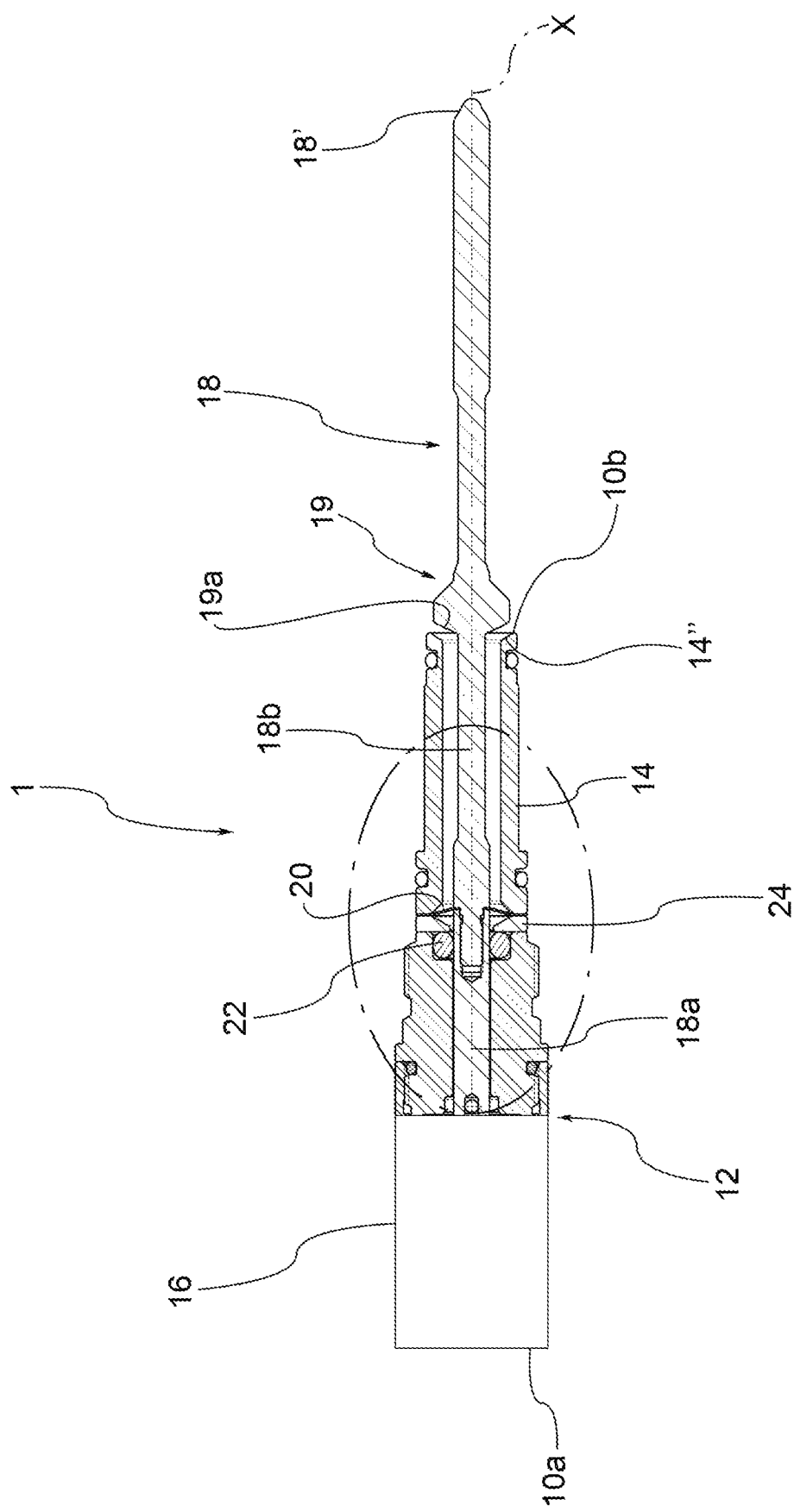
FIG. 1 is an axial cross-section of a valve according to one aspect of the invention, in a general embodiment.
Figure 1A:
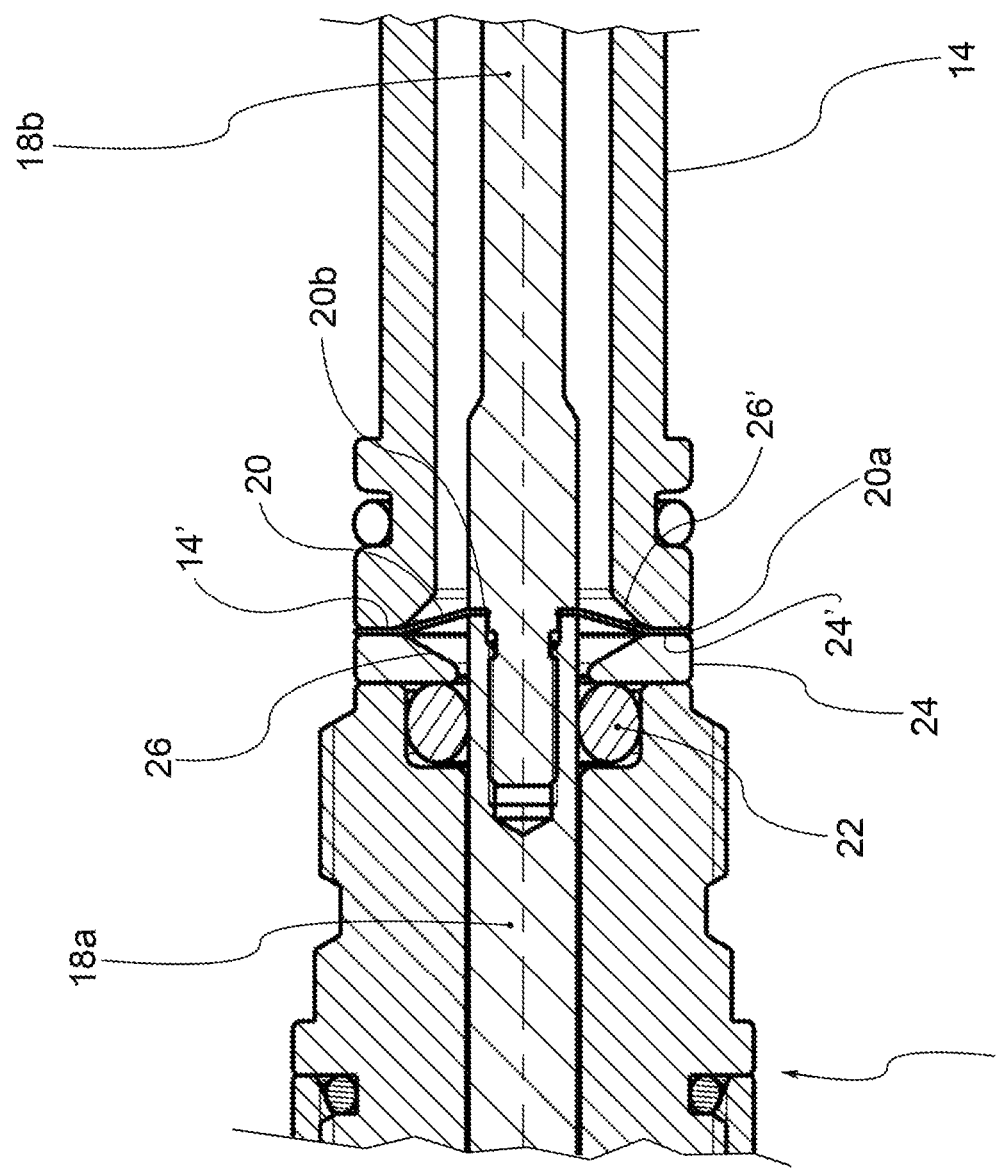
FIG. 1a is an enlarged view of the detail A" circled in FIG. 1.

In said drawings, reference numeral 1 globally denotes a fluid recirculation and dispenser valve according to one aspect of the invention.

The valve 1 comprises a valve body 10 which extends in an axial direction X between a proximal end 10a and a distal end 10b, and which comprises a proximal actuation portion 12 and a distal recirculation portion 14. The proximal actuation portion 12 houses, at least partially, actuator means 16 used to control the valve. In one embodiment, the distal recirculation portion 14 is provided with a recirculation aperture 15 (visible in FIGS. 2 and 2a) suitable for placing in fluidic communication said distal recirculation portion 14 with a recirculation duct of the fluid to be dispensed.

A valve rod 18 extends partially in the valve body and is axially movable, by means of said actuator means 16, between a closed rearward position of said distal end 10b of the valve body 10 and an open forward position of said distal end 10b of the valve body 10.

According to one aspect of the invention, said proximal 12 and distal 14 portions of the valve body 10 are fluidically isolated from each other by a membrane sealing gasket 20 integral with the valve rod 18. Said membrane sealing gasket 20 is suitable in particular for preventing any type of contamination of the proximal actuation portion 12 of the valve body 10 by the fluid to be dispensed, which instead circulates in the proximal recirculation portion 14 of the valve body 10.

In one embodiment, the membrane sealing gasket 20 is added to a traditional annular gasket 22 placed around the valve rod 18 at the point in which it enters the proximal portion 12 of the valve body.

In a preferred embodiment, the proximal 12 and distal 14 portions of the valve body are axially separate from each other. The membrane sealing gasket 20 has an outer rim 20a positioned between and retained by the facing ends of said proximal 12 and distal 14 portions and an inner rim 20b integral with the valve rod.

More specifically, the valve rod 18 is formed by the axial coupling at least of a proximal portion of rod 18a housed in the proximal portion 12 of the valve body, and a distal portion of rod 18b housed in the distal portion 14 of the valve body. Said proximal and distal portions of the valve rod 18 are for example connected to each other by screwing. In this preferred embodiment, said inner rim 20b of the membrane sealing gasket 20 is positioned between and retained by axial contact surfaces of said proximal 18a and distal 18b portions of the valve rod 18.

In one embodiment, the end of the proximal portion of the valve body comprises a gland 24 defining a flat annular gland surface 24' suitable for abutting against a corresponding flat annular gland surface 14' made at the end of the distal portion 14 of the valve body. In this embodiment, the outer rim 20a of the membrane gasket 20 is positioned between said flat facing annular surfaces 14', 24'.

Furthermore, said annular gland surfaces connect to the respective inner lateral surfaces of the proximal portion 12 and of the distal portion 14 of the valve body by means of inclined connection surfaces 26, 26' so as to enable an oscillation of the membrane gasket 20 following translation of the valve rod. In other words, the membrane sealing gasket 20 is in the form of a diaphragm having a fixed peripheral rim and a central portion susceptible to oscillate axially, inasmuch as integral with the valve rod. Being retained or "pinched" like a sandwich, between the proximal and distal portions of the valve body peripherally and between the proximal and distal portion of the valve rod centrally, such diaphragm forms a barrier which prevents any contact between the liquid circulating in the distal portion of the valve body and the remaining part of the valve behind the diaphragm.

According to another aspect of the invention, the valve rod 18 presents, in an intermediate area of its extension projecting from the distal portion of the valve body 10, a radial expansion 19 defining a conical sealing surface 19a facing the distal end 10b of the valve body. Said distal end 10b of the valve body has a flared inner sealing rim 14" suitable for abutting against said conical surface 19a when the valve rod is in the rearward position to hermetically close said distal end 10b. Thanks to such coupling of inclined surfaces the use of sealing gaskets to close the valve body may be avoided.

Figure 2A:
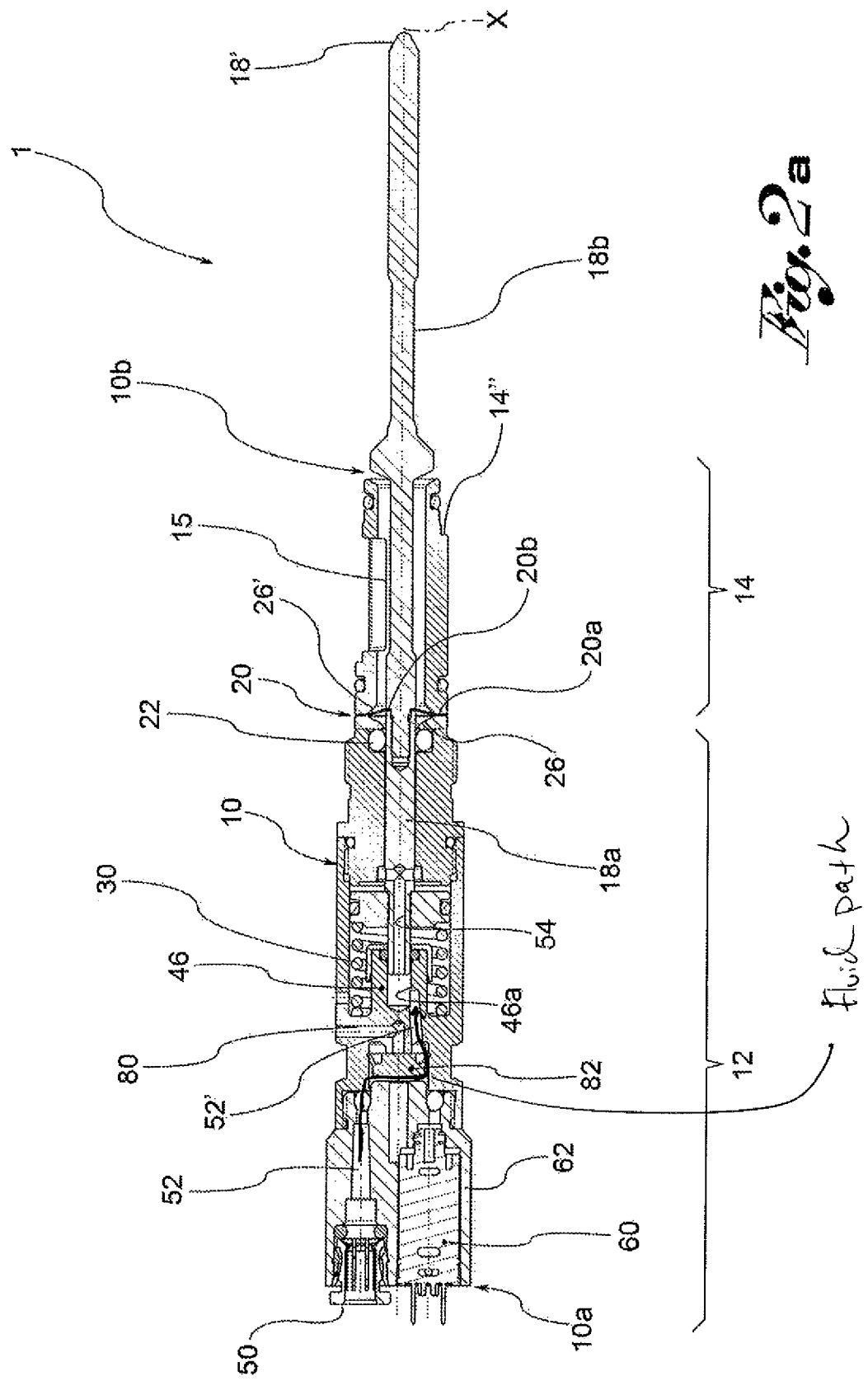
FIG. 2a is an axial cross-section of the valve in FIG. 2 assembled.

In one embodiment shown in FIGS. 2, 2a and 3, the valve rod 18 is normally kept in a forward position by an elastic element 30, for example a helical spring, housed in the proximal actuation portion 12 of the valve body.

In one embodiment, the actuator means 16 which control the movement of the valve rod 18 are of the pneumatic type. More specifically, the proximal actuation portion 12 comprises a cylinder portion 40 defining a chamber 42 in which a piston 44, integral with the valve rod 18, is placed. The elastic element 30 is housed in said chamber 42 in such a way as to influence said piston, and therefore the valve rod, to remain in the forward position. For example if the piston 44 separates the chamber 42 of the cylinder portion into a front part 42a, facing the proximal end of the valve body, and a rear part 42b, facing the distal end of the valve body, the elastic element 30 is placed in the front part 42a of the chamber, between the piston 44 and an end wall, from which an axial projection 46 extends guiding the elastic element 30.

The piston 44 of the cylinder portion is operated, against the force of the elastic element 30, by a pressurised control fluid, such as compressed air, coming from a control fluid input connection 50 housed in the proximal portion 12 of the valve body. The chamber 42 of the cylinder portion 40 is in fluidic communication with said input connection 50 by supply passages 52 made inside the proximal portion 12 of the valve body 10.

In one embodiment, the flow of said control fluid to the chamber 42 of the cylinder portion 40 is controlled by a solenoid valve 60. In other words, a supply passage 52 passes through the solenoid valve 60, which is fitted with an obturator body suitable for intercepting the flow of the control fluid of the piston.

Advantageously, the input connection 50 and the solenoid valve are positioned alongside each other and inserted in a cap 62 to form a single assembly closing the proximal end 10a of the valve body.

In one embodiment, the piston 44 is placed around a proximal end portion of the valve rod 18 crossed by a supply passage 54 which places the supply ducts 52 made in the valve body, coming from the input connection 50 in communication with the rear part 42b of the chamber 42 of the cylinder portion 40, that is so that the command fluid can act on the surface of the piston opposite that on which the elastic element 30 acts. More specifically, the perforated proximal end of the valve rod 18 is inserted in an axial hole 46a made in the guide projection 46 of the elastic element 30, which a terminal section 52' of the supply ducts 50 comes out in.

It should be noted that while remaining within the scope of the invention, the valve rod 18 may also be commanded to translate by non-pneumatic actuator means 16, for example electric, electronic, mechanical or a combination of the same.

The proximal portion 12 of the valve body lastly comprises a threaded axial portion 70. For example said threaded axial portion 70 is comprised between the cylinder portion 40 and the gland 24.

In a practical embodiment of the valve body 10, the proximal portion 12 of said vale body comprises, starting from the proximal end, an electro-pneumatic unit 50, 60 formed of the input connection 50 of the pressurised command fluid and the solenoid valve 60, alongside one another and inserted in the cap 62, which terminates with a threaded distal end 62a. Said cap 62 is screwed to a threaded proximal end 40a of the cylinder portion 40. Such threaded end 40a communicates fluidically, through supply ducts 52, with the axial hole 46a made in the axial guide projection 46 which extends in the chamber 42 of the cylinder portion. Said chamber 42 terminates with a threaded distal end 40b so as to be screwed to a proximal threaded end 70a of the threaded axial portion 70 of the valve body. Such threaded axial portion 70 has a further outer threading 70b for screwing the valve body 10 to a cartridge body 110;210;310 which forms, together with the valve 1, a fluid recirculation and dispenser valve unit 100; 200; 300 which will be described below.

It is to be noted that, in a preferred embodiment, the terminal section 52' of the supply ducts 52 is in fluidic communication with a vent hole 80 open towards the external environment to achieve a rapid discharge of the fluid when the solenoid valve closes the passage of the control fluid, and therefore very fast response times of the solenoid valve. More specifically, when the valve is activated, for example by excitation of the solenoid valve 60, said vent hole 80 is closed by a mobile obturator 82 housed for example in a lowered area of the cylinder portion 40; when the valve is deactivated, said mobile obturator 82 rises and rapidly discharge the compressed air into the ducts 50, 52' through the vent hole 80.

The above disclosed valve 1 is at least partially inserted in an axial valve seat 90 made in a cartridge 110;210;310, so as to form a fluid recirculation and dispenser valve unit 100;200;300, for example applicable to a dispenser head 500.

Said axial valve seat 90 of the cartridge comprises a proximal recirculation portion 91, which houses the distal recirculation portion 14 of the valve so as to be tight and which communicates fluidically with a recirculation duct 92, and a distal dispenser portion 93, which extends between the distal end of the valve body and a distal end 93a of the valve seat. Said distal end of the valve seat 93a defines a dispenser nozzle 94. The distal end 18' of the valve rod 18 acts in conjunction with said dispenser nozzle 94 so as to open/close the nozzle following axial translation of the valve rod 18. The dispenser portion 93 of the valve seat is in fluidic communication with a supply duct 95. Said supply duct 95 is suitable for supplying the dispenser portion with the fluid to be dispensed.

In one embodiment, the supply and recirculation ducts 92, 95 are directed in a substantially transversal manner to the valve seat 90, that is they come out in the side wall which delimits said valve seat 90.

In a preferred embodiment, the cartridge 110;210;310 comprises a radial coupling portion 112;212;312 which, as explained below, permits a coupling of the valve unit to a dispenser head 500. Said radial coupling portion extends radially from one side of the axial valve seat, preferably substantially along the entire axial extension of the valve seat 90. In addition, said radial portion 112;212;312 has a plate-like structure which extends that is mainly in a vertical plane on which the axis X of the valve lies. Said plate-like structure is made in such a way that when the valve unit is seen from the front, said radial coupling portion does not project beyond the space occupied by the front part of the cartridge housing the valve (FIG. 4a).

In a preferred embodiment, the recirculation and supply ducts 92, 95 are made in the radial coupling portion 112; 212;312. In particular the supply duct 95 communicates with an input connection 95a of the fluid to be dispensed, to which a supply tube of the fluid may be connected; the recirculation duct 92 communicates with an output connection 92a of the fluid, to which a recirculation tube of the fluid may be connected, for example connected to a recirculation pump.

Said input and output connections 92a, 95a are inserted in the radial coupling portion 112;212;312 of the cartridge, preferably on the side opposite the valve and with the respective axes lying in the vertical plane of said radial portion, so as to leave the side walls of the same free.

In a preferred embodiment, in order to reduce the thickness of the radial coupling portion 112;212;312 as much as possible the supply and recirculation ducts 92, 95 have an oval or rectangular transversal cross-section, in any case elongated in the vertical plane on which the axis X of the valve lies.

The lower side of the radial portion 112,212;312 is fitted with releasable attachment means 96 for the connection of the valve unit to a dispenser head 500. For example said releasable attachment means 96 comprise a flexible attachment tooth facing downwards.

According to another aspect of the invention, the distal portion 93 of the axial valve seat 90 is provided with longitudinal guide ribs 97 suitable for supporting in a guided manner the distal portion 18b of the valve rod 18 projecting from the valve body. Such longitudinal guide ribs 97 are particularly advantageous in that, on account above all of the presence of the radial portion of the cartridge, which has an axial extension such as to permit an overlapping in height of the supply and recirculation ducts with the relative connection and the attachment means to the dispenser head, the valve seat, and in particular its distal dispenser portion, has a considerable axial extension. Such extension of the valve seat corresponds to a certain length of the valve rod, in particular of the distal section projecting from the valve body. Without the guide ribs 97, the radial flow of the fluid coming from the dispenser duct 95 could cause radial oscillations of the valve rod and therefore a non-optimal seal of the dispenser nozzle 94 and/or the distal end 10b of the valve body. In addition, without the guide ribs 97, the output flow from the valve might not be perfectly uniform on the through section of the dispenser nozzle 94.

Getting back to the coupling between the valve rod 18 and the dispenser nozzle 94, in a preferred embodiment the dispenser nozzle 94 forms a conical seat. The distal end 18' of the valve rod has a conical form suitable for abutting against said conical seat to hermetically close the dispenser nozzle 94 when said rod is in the forward position. Such embodiment with conical walls makes it possible to avoid the use of sealing gaskets to ensure the hermetic closure of the dispenser nozzle.

In a preferred embodiment, the recirculation portion 91 of the axial valve seat and the recirculation portion of the valve body are counter-shaped in such a way that said recirculation portion 14 of the valve body is axially blocked in said axial valve seat 90. In other words, the recirculation portion 91 of the valve seat has one or more radial abutment shoulders 91a, against which corresponding radial shoulders 14" made in the distal portion 14 of the valve body 10 abut.

In addition, in a preferred embodiment, the axial valve seat has an open proximal, that is upper, end 98, having a threaded inner wall. The threaded portion 70 of the valve body screws into said threaded end 98. Consequently, the assembly of the valve in the cartridge is very simple, fast and safe. First the various parts of the valve are assembled. In particular the proximal 12 and distal 14 portions of the valve body, with the interposition of the gland 24, if present, are connected solely by the valve rod 18, but are not tightened to each other. The pre-assembled valve is then placed in the valve seat 90; then the threaded portion 70 of the valve body is screwed into the threaded end 98 of the valve seat. After screwing, the distal recirculation portion 14 of the valve body abuts axially against the respective abutment shoulders 91a made in the valve seat. At this point, the proximal 12 and distal 14 portions of the valve may be fully tightened to each other, blocking the outer rim of the membrane gasket.

In a preferred embodiment, when the valve is mounted in the cartridge, the proximal actuation portion 12 of the valve substantially projects from the proximal end of the axial valve seat. In particular the electro-pneumatic control unit 50, 60 of the valve is distanced from the cartridge, in such a way that the electric and pneumatic connections connected to said unit are clearly separate from the supply and recirculation ducts of the fluid to be dispensed. When, as illustrated below, the dispenser head is provided with a large number of valve units, it is extremely advantageous to be able to separately access the electro-pneumatic connections and the ducts of the fluid to be dispensed.

A dispenser head 500 comprising a plurality of valve units 100;200;300 as described above will now be described.

The dispenser head 500 comprises a circular manifold 510 supporting a plurality of valve units 100;200;300. Said manifold 510 comprises an inner circular portion 520 in which dispenser holes are made 521,522,523 which respective dispenser nozzles 94 of the valve units are inserted in. Around said circular inner portion 520 an outer circular crown 530 is positioned along which the cartridges 110; 210; 310 of the valve units are attached, one beside the other. In other words, considering as reference the centre of the dispenser head, the radially outermost part of the cartridge, that is the radial coupling portion 112;212;312, is attached to the outer circular crown 530 of the manifold; e innermost radial part of the cartridge, which houses the valve 1, projects onto the inner circular portion 520 of the manifold, so that the distal end of the valve seat is inserted in a respective dispenser hole 521,522,523.

In one advantageous embodiment, the cartridges of the valve units are snap-attached to said circular crown 530 of the manifold. For example the outer circular crown presents, for each cartridge, a radial split 532, suitable for snap receiving a lower rim of the radial coupling portion of the cartridge, and a coupling aperture 534 in which the elastic tooth 96 of the cartridge snap engages.

Consequently, advantageously, each single valve unit can be connected to and detached from the dispenser head 500, independently of the other cartridges. In addition, the coupling and removal of the cartridge can be performed rapidly and easily, without the use of tools.

Clearly, other detachable coupling systems of the valve units to the dispenser head are possible, such as by means of screws. However, the snap coupling between the elastic tooth 96 of the cartridge and the attachment aperture 534 is particularly advantageous in that, as well as avoiding the use of tools, it makes both the coupling and removal of the valve units easy even when numerous units, and therefore numerous cables and ducts, are present on the same dispenser head.

Figure 5:
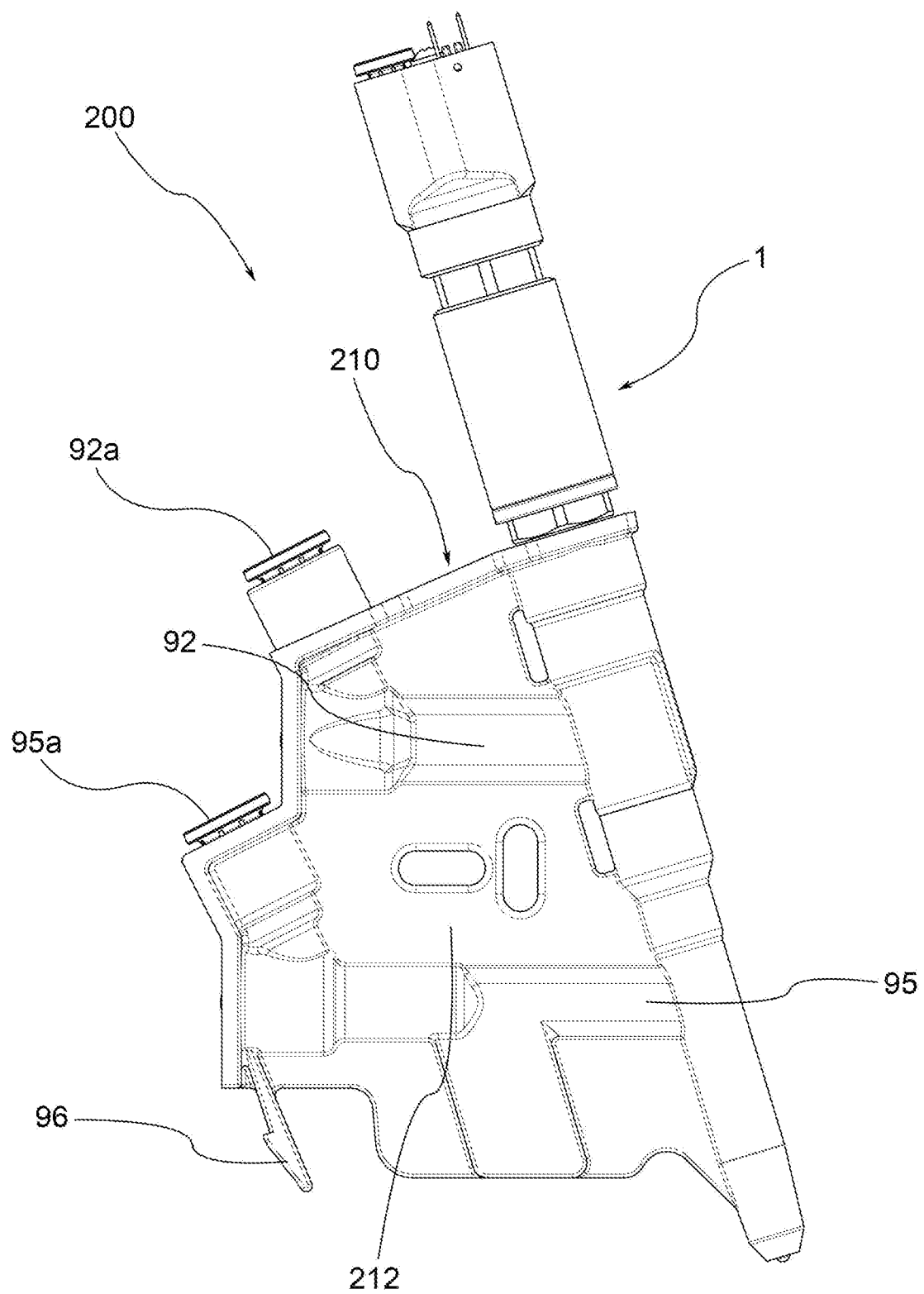
FIGS. 5 and 6 show, in a side view, an intermediate valve unit and an outer valve unit.
Figure 6:
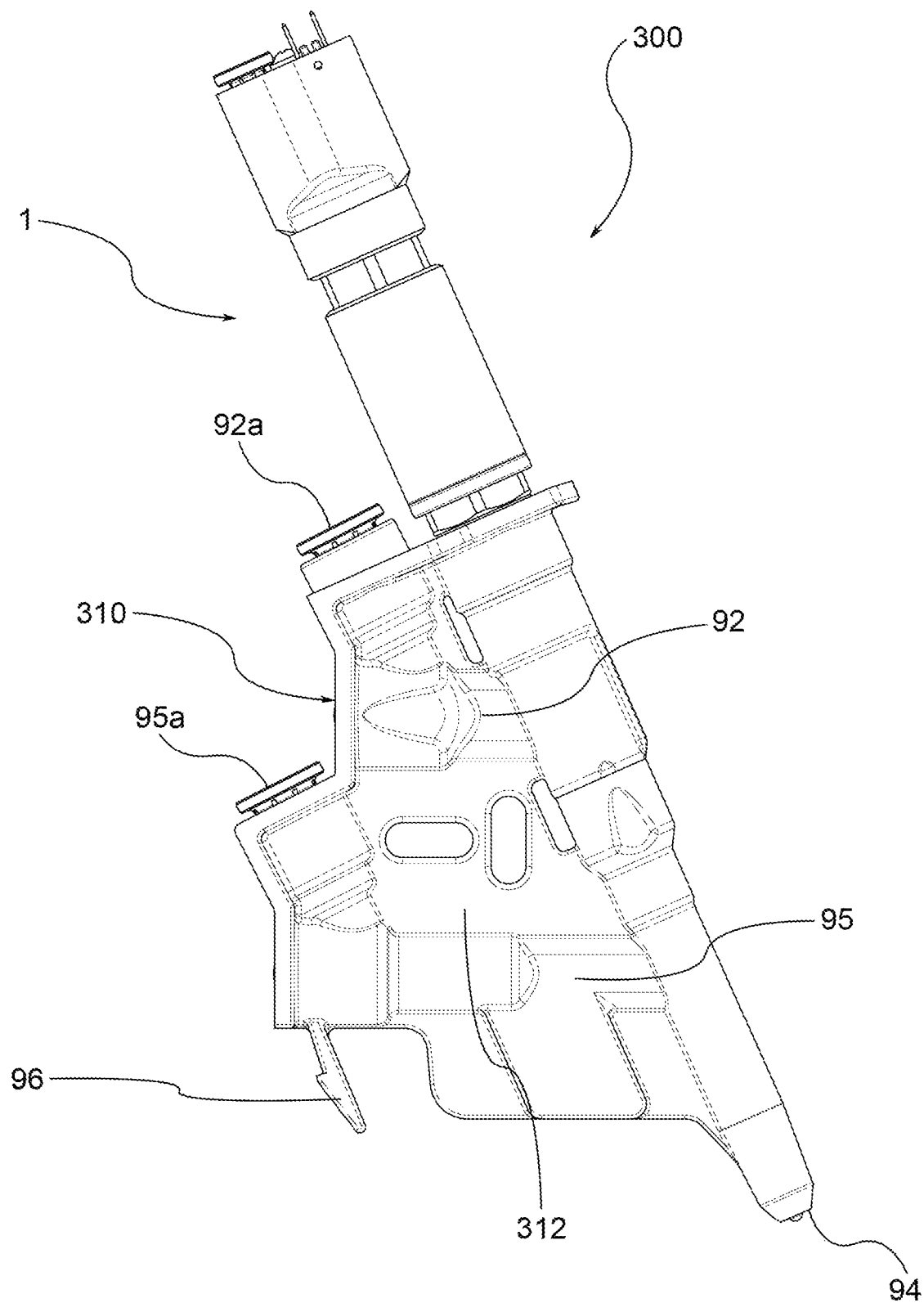
Figure 7:
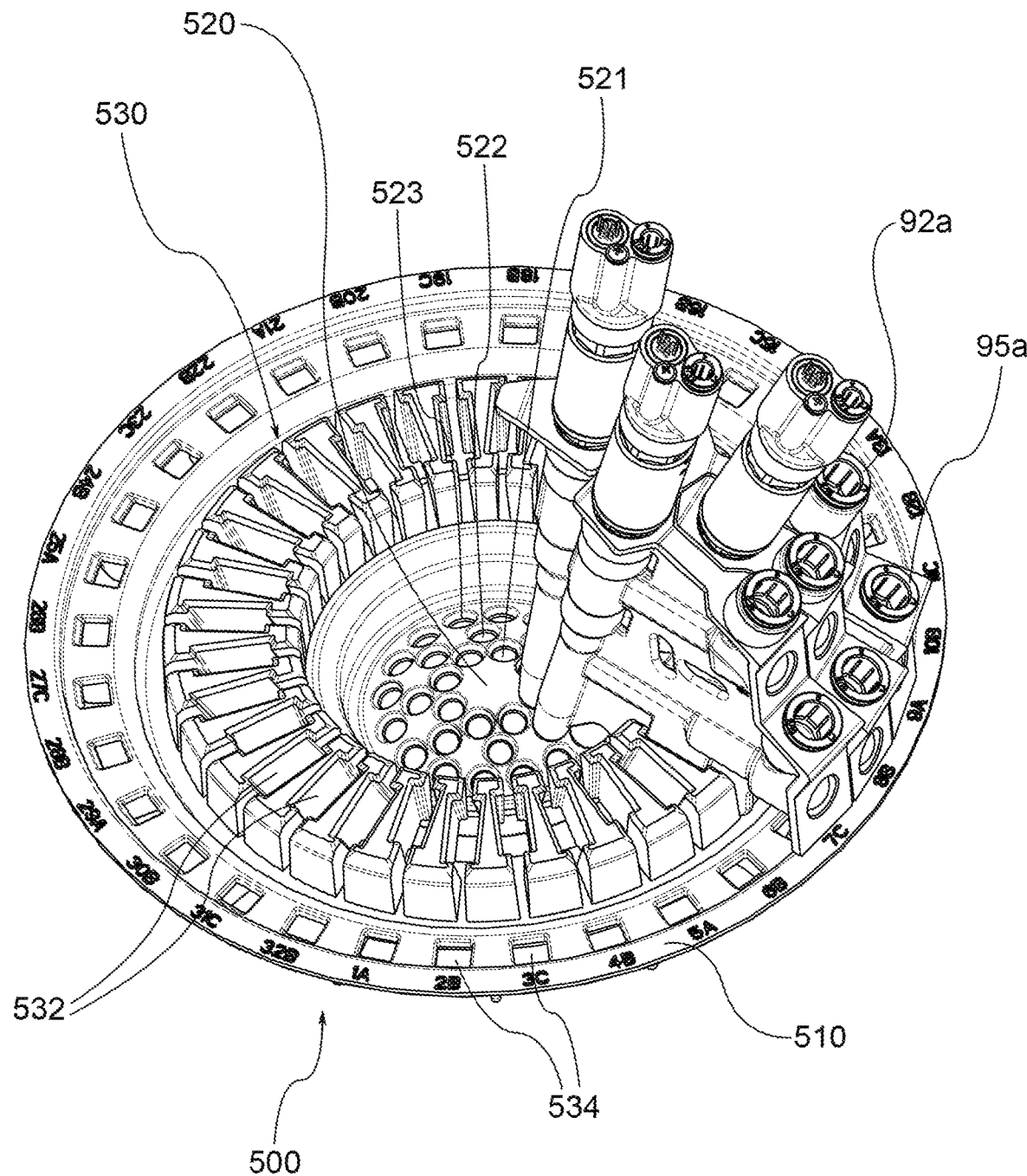
FIG. 7 shows, in a perspective view, a dispenser head with three adjacent valve units.
Figure 8:
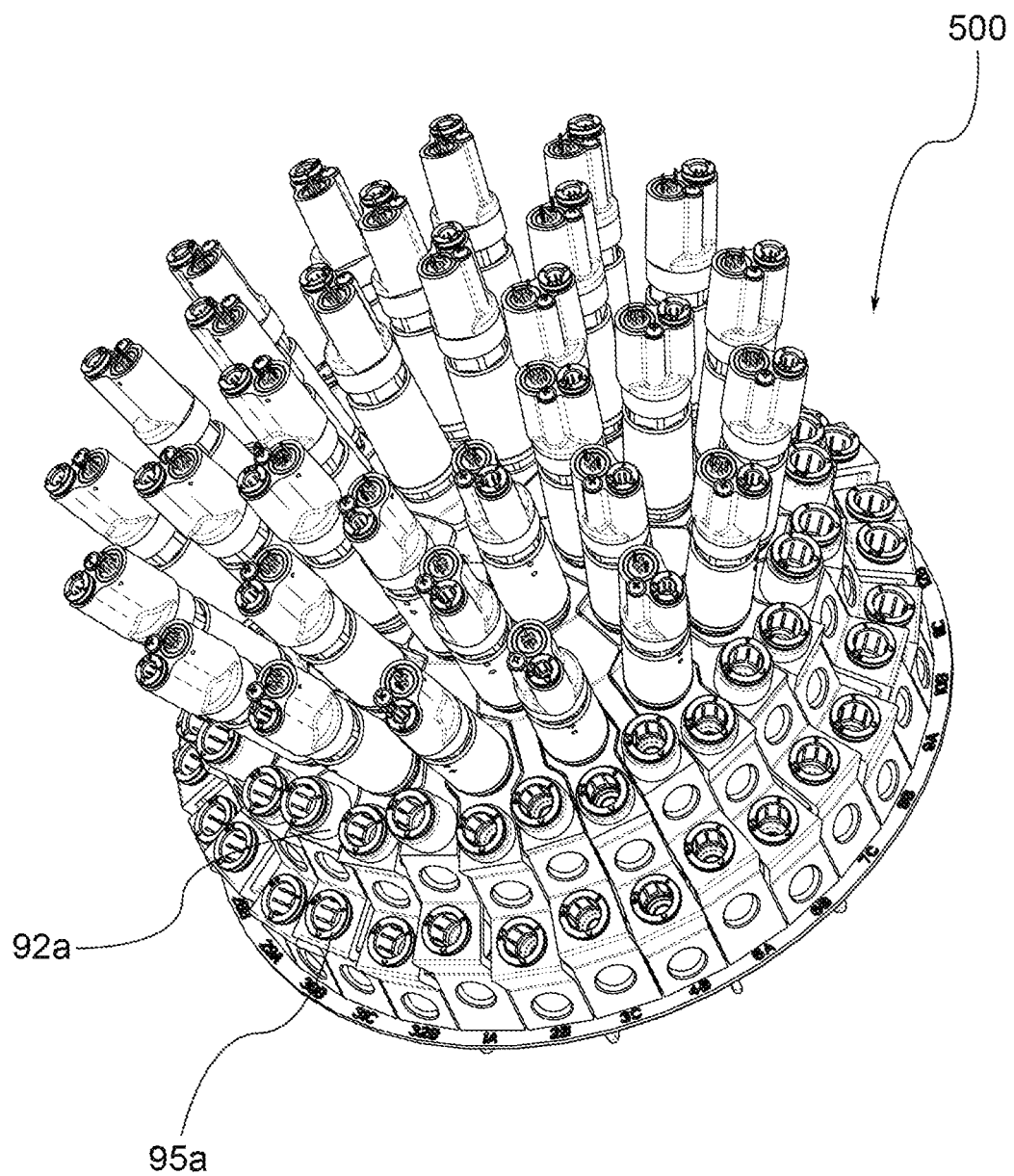
FIG. 8 shows the dispenser head complete with all the valve units.

In one particularly advantageous embodiment, at least two circular rows of dispenser holes are made in the central portion of the manifold. Said two rows of holes are at a different distance from the centre of the manifold and the holes of one row are circumferentially staggered in relation to the holes of the other rows. In the example show, a first row of holes 523 distributed along an outer circumference, a second row of holes 522 distributed along an intermediate circumference, and a third row of holes 521 distributed along an outer circumference are made in the central portion of the manifold. The circular manifold supports valve unit having cartridges of at least two (in this case three) different shapes which alternate along the outer circular crown. As may be seen from FIGS. 4-6, different shapes are taken to mean that, while the portion of the cartridge housing the valve 1 is the same for all the cartridges, the radial coupling portion 112;212;312 is the same height in an axial direction but has a different radial extension. Such different radial extension is reflected in a different radial distance which separates the valve 1 from the input 95a and output 92a connections of the fluid and from the elastic coupling tooth 96. Consequently, in the example show the manifold supports inner valve units 100 (FIG. 4), that is having the radial coupling portion of greater radial breadth, so as to couple the valve to the inner dispenser holes 521, intermediate valve units 200 (FIG. 5), that is having the radial portion with an intermediate extension, so as to couple the valve to the intermediate dispenser holes 522, and outer valve units 300 (FIG. 6), that is having the radial portion with a lesser extension, so as to couple the valve to the outer dispenser holes 523.

Thanks to such radial staggering of the part of the cartridge housing the valve, it is possible to shape the cartridges in a complementary manner so that the valves of two adjacent valve units are circumferentially staggered and partially overlapping radially. In particular the valve of a valve unit with cartridge having a radial portion of lesser extension finds itself alongside a central zone of the radial portion of greater extension of the adjacent cartridge, between the valves and fluid input and output connections. The overall dimensions occupied by such two different valve units, along the outer crown of the manifold, is therefore less than the dimension which two valve units the same as each other would have.

Figure 9:
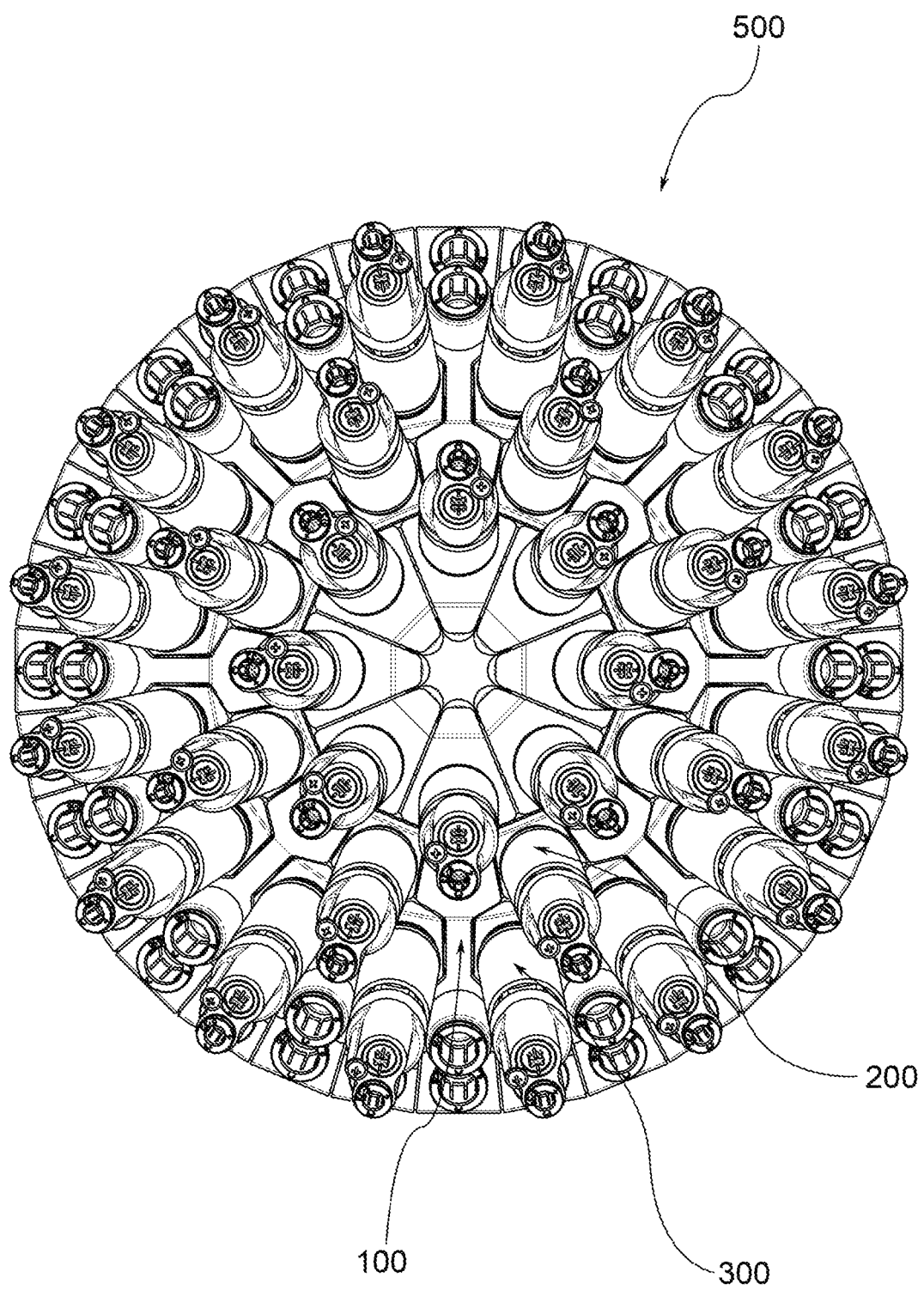
FIG. 9 is a ground view from above of the dispenser head in FIG. 8.

In the example shown, an inner valve unit has an outer valve unit at its sides; each outer valve unit is positioned between an inner valve unit and an intermediate valve unit, as illustrated in particular in FIG. 9.

Thanks to such "snap" coupling between adjacent valve units having radial coupling portions of different dimensions, the entire surface of the circular manifold can be utilised to the full and therefore, for the same diameter of said manifold, fit a much greater number of valve units on the dispenser head than the current dispenser heads.

It is to be noted that the dispenser head can in any case function with any number of valve units, given that each of these is completely independent of the others.

The functioning of each valve unit is as follows.

Figure 10:
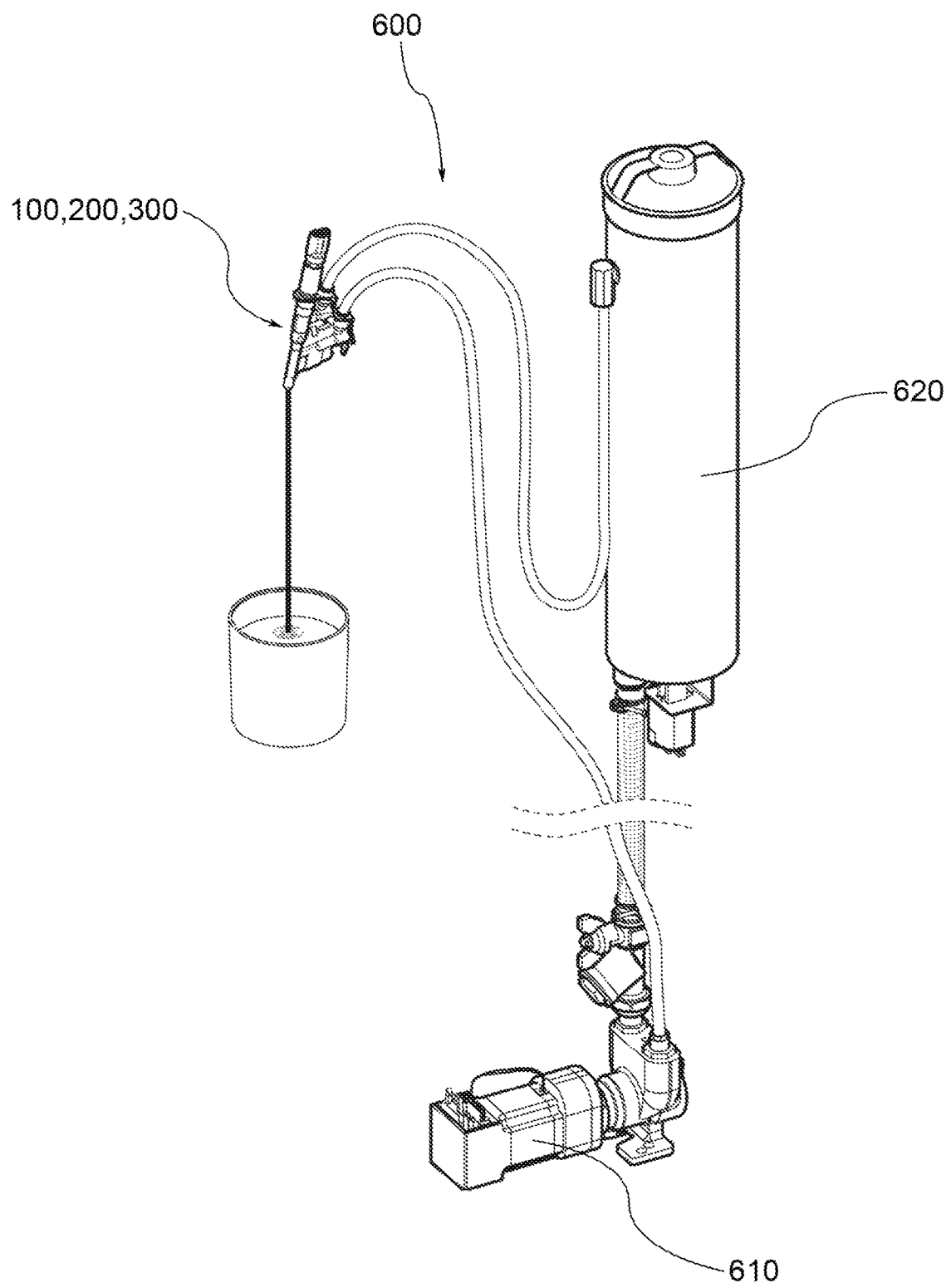
FIG. 10 is a diagram of a supply and recirculation circuit of a fluid connected to a valve unit.

As shown in the diagram in FIG. 10, a valve unit 100;200,300 is connected, by means of the fluid input and output connections 92a, 95a, to a fluid recirculation and supply circuit 600 comprising for example a supply pump 610 and a tank 620 containing the fluid to be dispensed.

In the absence of an actuation command of the valve, the valve rod, stressed by the elastic element, is in the forward closed position of the dispenser nozzle and aperture of the distal end of the valve body. All the fluid which flows into the valve unit therefore circulates in the distal portion of the valve seat and in the distal recirculation portion of the valve body. From here, for example under the effect of the supply pump 610, the fluid enters the recirculation duct and returns to the tank 620.

When the valve rod is commanded to move backwards, for example by supplying an electric command to the solenoid valve which controls the passage of the pressurised command fluid from the pneumatic input connection to the cylinder portion of the valve body, the conical end of the valve rod detaches from the dispenser nozzle, opening it, and at the same time the distal end of the valve body is closed by the conical radial projection of the command rod. All the fluid entering the distal portion of the valve seat through the supply duct, not being able to enter the recirculation portion of the valve body, comes out of the valve seat through the dispenser nozzle.

Throughout the functioning of the valve unit, the part of the valve and of the valve seat in which the fluid circulates is completely isolated from the actuation part of the valve, thereby prolonging the life of the valve unit and reducing maintenance operations.

It is to be noted that the dispenser head, thanks to the modular nature of the individual valve units, comes to have a considerably simpler structure than those of the prior art. While the latter must necessarily be produced by machining, the head according to the invention can also be made by moulding.

In addition, during the life of the dispenser head, in the case of a traditional head, in other words which integrates all the dispenser and recirculation valve units in a single body, if a nozzle is damaged all the valves need to be dismantled, the head removed, a complete head remounted and all the valves inserted once again. With the head according to the invention rather, the damaged valve unit can simply be replaced with a new one, in a fast, simple and economical manner.

A person skilled in the art may make modifications and adaptations to the embodiments of the valve unit and dispenser head according to the invention, replacing elements with others functionally equivalent, so as to satisfy contingent requirements, while remaining within the sphere of protection of the following claims. Each of the characteristics described as belonging to a possible embodiment may be realised independently of the other embodiments described.

The invention claimed is:

1. A fluid recirculation and dispenser valve for an industrial paint, comprising:
   a valve body which extends in an axial direction between a proximal end and a distal end and which comprises a proximal actuation portion, in which actuator means are at least partially housed, and a distal recirculation portion, fluidically communicating with a recirculation duct of said fluid;

a valve rod which extends partially in said valve body and which is axially movable, by means of said actuator means, between a closed rearward position of said distal end of the valve body and an open forward position of said distal end of the valve body, characterized in that said proximal and distal portions of the valve body are fluidically isolated from each other by a membrane sealing gasket integral with the valve rod;

wherein the proximal actuation portion is distanced from the recirculation portion such that the fluid supplied in input and directed towards the recirculation portion does not contaminate the actuation components of the valve;

wherein the distal recirculation portion is provided with a recirculation aperture which places in fluidic communication said distal recirculation portion with a recirculation duct of the fluid to be dispensed and wherein the recirculation aperture is isolated from the proximal portion by the membrane sealing gasket integral with the valve rod, wherein said proximal and distal portions of the valve body are axially separated from each other, wherein the valve rod has a proximal portion, which is housed in the proximal portion of the valve body and a distal portion, which is housed in the distal portion of the valve body, said proximal portion and said distal portion of the valve rod are axially coupled and the inner rim of the membrane sealing gasket is positioned between and retained by axial contact surfaces of said proximal and distal portions of the valve rod, wherein said membrane sealing gasket has an outer rim positioned between and clamped by the facing ends of said proximal and distal portions of the valve body and an inner rim integral with the valve rod, and wherein the end of the proximal portion of the valve body comprises a gland defining a flat annular gland surface suitable for abutting against a corresponding flat annular gland surface made at the end of the distal portion of the valve body, the outer rim of the membrane gasket being positioned between said annular surfaces, and wherein the distal recirculation portion of the valve body has one or more radial shoulders that abut to radial abutment shoulders of a valve seat, which is housing the valve.

2. The fluid recirculation and dispenser valve according to claim 1, wherein the proximal portion of the rod and a distal portion of the valve rod are coupled by screwing.

3. The fluid recirculation and dispenser valve according to claim 1, wherein said annular gland surfaces are connected to the respective inner lateral surfaces by means of inclined connection surfaces so as to enable an oscillation of the membrane gasket following translation of the valve rod.

4. The fluid recirculation and dispenser valve according to claim 1, wherein the valve rod presents, in an intermediate area of its extension projecting from the distal portion of the valve body, a radial expansion defining a conical sealing surface facing the distal end of said distal portion of the valve body, and wherein said distal end of the valve body has a flared inner sealing rim suitable for abutting against said conical surface when the valve rod is in the rearward position to hermetically close said distal end without the interposition of sealing gaskets.

5. The fluid recirculation and dispenser valve according to claim 1, wherein the valve rod is normally kept in a forward position by an elastic element housed in the proximal actuation portion of the valve body.

6. The fluid recirculation and dispenser valve according to claim 1, wherein said actuator means are of the pneumatic type.

7. The fluid recirculation and dispenser valve according to claim 6, wherein the proximal actuation portion comprises a cylinder portion defining a chamber in which a piston integral with the valve rod is placed, the elastic element being housed in said chamber so as to influence said piston and thereby the valve rod in a forward position.

8. The fluid recirculation and dispenser valve according to claim 6, wherein said cylinder chamber is in fluidic communication with control unit input connection for the supply of a pressurized fluid to the valve suitable for commanding the piston of the cylinder against the force exerted by the elastic element.

9. The fluid recirculation and dispenser valve according to claim 8, wherein the flow of said control fluid to the chamber of the cylinder portion is controlled by a solenoid valve.

10. The fluid recirculation and dispenser valve according to claim 9, wherein said input connection and said solenoid valve are placed so as to close the proximal end of the valve body.

11. The fluid recirculation and dispenser valve according to claim 7, wherein the piston is placed around a proximal end portion of the valve rod crossed by a supply passage which places in communication the supply ducts made in the valve body and coming from the input connection with the surface of the piston opposite that on which the elastic element acts.

12. The fluid recirculation and dispenser valve according to claim 1, wherein the proximal portion of the valve body comprises a threaded axial portion, having a distal treaded end with outer treading for screwing the valve to a valve seat.

13. A fluid recirculation and dispenser valve unit, comprising a cartridge in which an axial valve seat is made which at least partially houses the fluid recirculation and dispenser valve according to claim 1, said axial valve seat comprises a proximal recirculation portion, which houses the proximal recirculation portion of the valve so as to be tight and which communicates fluidically with a recirculation duct, and a distal dispenser portion, which extends between the distal end of the valve body and a distal seat end defining a dispenser nozzle acting in conjunction with the distal end of the valve rod, said dispenser portion being in fluidic communication with a dispenser duct.

14. The fluid recirculation and dispenser valve unit according to claim 13, wherein said cartridge comprises a radial coupling portion which extends radially from one side of the axial valve seat, the dispenser and recirculation ducts being made in said radial portion and terminating with respective input and out connections of the fluid to be dispensed inserted in said radial portion, the lower side of said radial portion being fitted with releasable attachment means for the connection of the valve unit to a dispenser head.

15. The fluid recirculation and dispenser valve unit according to claim 13, wherein the distal portion of the axial valve seat is provided with longitudinal guide ribs suitable for supporting in a guided manner the distal portion of the valve rod projecting from the valve body.

16. The fluid recirculation and dispenser valve unit according to claim 13, wherein the dispenser nozzle forms a conical seat, and wherein the distal end of the valve rod has a conical form suitable for abutting against said conical seat to hermetically close the dispenser nozzle when said rod is in the forward position.

17. The fluid recirculation and dispenser valve unit according to claim 13, wherein the recirculation portion of the axial valve seat and the recirculation portion of the valve body are counter-shaped in such a way that said recirculation portion of the valve body is axially blocked in said axial valve seat.

18. The fluid recirculation and dispenser valve unit according to claim 13, wherein the axial valve seat has an open proximal end having a threaded wall, and wherein the threaded portion of the valve body is screwed into said proximal end.

19. The fluid recirculation and dispenser valve unit according to claim 18, wherein the proximal actuation portion of the valve substantially projects from the proximal end of the axial valve seat.

20. A dispenser head, comprising a circular manifold supporting a plurality of fluid recirculation and dispenser valve units according to claim 13, said manifold comprising an inner circular portion, in which dispenser holes are made which respective dispenser nozzles of the valve units are inserted in, and an outer circular crown along which the cartridges of the valve units are attached, one beside the other.

21. The dispenser head according to claim 20, wherein said cartridges are snap-attached to said circular crown.

22. The dispenser head according to claim 21, wherein the outer circular crown presents, for each cartridge, a radial split, suitable for receiving a lower rim of the radial coupling portion of the cartridge, and a coupling aperture in which an elastic tooth made in said lower rim of the radial portion snap inserts.

23. The dispenser head according to claim 20, wherein at least two circular rows of dispenser holes are made in the central portion of the manifold, said two rows of holes being at a different distance from the center of the manifold, the holes of one row being circumferentially staggered from the holes of the other rows, and wherein the circular manifold supports valve units having cartridges of at least two different shapes which alternate along the outer circular crown, adjacent cartridges being shaped in a complementary manner so that the valves of two adjacent valve units are circumferentially staggered and partially overlapping radially.

* * * * *